United States Patent [19]

Meyer et al.

[11] Patent Number: 5,256,304

[45] Date of Patent: Oct. 26, 1993

[54] METHODS OF REMOVING OIL AND METAL IONS FROM OILY WASTEWATER

[75] Inventors: Ellen M. Meyer, Doylestown; Michael R. Wood, Philadelphia, both of Pa.

[73] Assignee: Betz Laboratories, Inc., Trevose, Pa.

[21] Appl. No.: 893,483

[22] Filed: Jun. 5, 1992

[51] Int. Cl.⁵ ................................................. C02F 1/56
[52] U.S. Cl. ..................................... 210/708; 210/728; 210/730; 210/912; 210/913; 210/914; 252/338; 252/358; 252/180
[58] Field of Search ............... 210/708, 725, 727, 728, 210/730, 735, 912, 913, 914; 252/180, 181, 338, 358; 524/72, 73

[56] References Cited

U.S. PATENT DOCUMENTS

| Re. 29,908 | 2/1979 | Fowler et al. | 210/51 |
| 4,558,080 | 12/1985 | Quamme et al. | 524/72 |
| 4,758,353 | 7/1988 | Spence et al. | 210/912 |
| 4,775,744 | 10/1988 | Schilling et al. | 530/501 |
| 4,781,839 | 11/1988 | Kelly et al. | 210/730 |
| 4,781,840 | 11/1988 | Schilling et al. | 210/730 |

FOREIGN PATENT DOCUMENTS

| 63315192 | 7/1986 | Japan . | |
| 61149078 | 12/1988 | Japan . | |
| 899721 | 6/1962 | United Kingdom | 210/730 |
| 2185739A | 9/1986 | United Kingdom . | |

*Primary Examiner*—Peter Hruskoci
*Attorney, Agent, or Firm*—Alexander D. Ricci; Philip H. Von Neida

[57] ABSTRACT

Methods are disclosed for removing oil and metal ions from oily wastewaters. Polymeric tannin amine compounds are added to the oily wastewater to demulsify the oil, and flocculate the metal ions.

7 Claims, No Drawings

METHODS OF REMOVING OIL AND METAL IONS FROM OILY WASTEWATER

FIELD OF THE INVENTION

The present invention relates to methods for treating oily wastewater. The treatment comprises a means for removing both oil and metal ions from the oily wastewater.

BACKGROUND OF THE INVENTION

In steel mill, automotive and machining industries, significant quantities of lubricants, cutting oils and cutting fluids are employed. These oil-containing waters, when spent, are sent to the plant's waste treatment facility where they are typically combined with other plant waste streams. In simple form, these "oily" waters contain undiluted petroleum oils and an emulsifier. However, in practice they typically contain fatty acids, surfactants, biocides, antioxidants and many other additives. Synthetic oils may also be present. Additionally, oily waste waters from these plants typically have a wide variety of other contaminants, including solids, metal fines, and sometimes dissolved metals. Iron and copper are the metals seen most often because equipment metallurgies are often fabricated from these metals.

In view of recent rigid environmental standards, increases in oil prices and decreases in oil supply, it has become very important to recover these oils for reuse. In the case of oil-in-water emulsions, de-emulsification may be achieved by acid addition, use of primary inorganic coagulants such as ferric sulfate or alum, or organic polymeric emulsion breakers. Often, oil skimmings resulting from oil-in-water destabilizations are emulsions too, but converted into a water-in-oil emulsion with a much higher oil content. Chemicals break emulsions by neutralizing repulsive charges between particles, precipitating or salting out the emulsifying agent and/or altering the interfacial film so it is readily broken. Reactive cations (H+, Al+3, Fe+3, cationic polymers) are particularly effective in breaking dilute oil in water emulsions. Once the charges have been neutralized and the interfacial film broken, the small oil droplets are able to coalesce upon collision with other droplets. The inorganic coagulants also provide a hydroxide floc for the adsorption of oil. While this aids in oil removal, it also increases the sludge volume, thus complicating oil recovery and creating a disposal problem. Finally, oil is extremely hard to extract from aluminum hydroxide floc.

Progressively stricter regulatory criteria have forced industry to drastically reduce the residual metal content in wastewater discharges, while the increased cost of disposal of solid metal wastes has forced industries to reduce their sludge volume. Almost all metals of concern precipitate as a hydroxide. However, they all reach minimum solubility at different pH values. A compromise pH must be chosen if removing several metals. The efficiency of metals removal will be limited by reaction time, hydroxide concentrations and settling rates. In addition, hydroxide precipitation and most other conventional methods of heavy metals removal produce copious amounts of sludge, usually classified as hazardous material. Heavy metal precipitants such as dithiocarbamates have the advantage that they produce a more compact sludge, but they are expensive and highly toxic.

SUMMARY OF THE INVENTION

The present invention relates to methods for removing oil and metal ions from oily wastewater. An amphoteric tannin amine compound is added to the oily wastewater and functions as both an emulsion breaker, removing oil from the wastewater, and as a metal precipitant. The resulting floc can then be removed by conventional means.

DESCRIPTION OF THE RELATED ART

Japanese Patent 61-149,078, Tosa et al. describes the use of a tannin copolymer to remove iron from wine. Japanese Patent 63-315,192, Kanie et al. describes the purification of wastewater containing a surfactant and/or oil using a tannin-containing polymeric flocculant.

Quamme et al., U.S. Pat. No. 4,558,080 teaches a method of forming an aqueous solution of a tannin based polymer by reacting a tannin, an amino compound and an aldehyde under slightly acidic conditions. U.S. Pat. No. 4,775,744, Schilling et al., teaches a lignin derivative formed from the reaction product of lignin, an aldehyde and a polyamine wherein said lignin derivative is useful as a flocculant and a tall oil pitch emulsifier. A similar lignin derivative is taught in U.S. Pat. No. 4,781,840, Schilling et al. for dewatering secondary papermill sludge. U.K. Patent application GB 2,185,739A, Kelly et al., teaches employing a tannin-based flocculant in combination with alum or ferric chloride to clarify water.

DETAILED DESCRIPTION OF THE INVENTION

The present invention relates to methods for removing oil and metal ions present in wastewater comprising addition of a sufficient amount of an amphoteric tannin amine polymer to flocculate said oil and metal ions. The resulting floc can then be removed by conventional means.

Tannins are polyphenolic compounds that occur naturally in various vegetative materials. Modified tannins can be obtained by reacting the tannin with an aldehyde and an amine. One polymeric tannin-amine compound useful in the present invention is formed in a Mannich reaction by reacting a tannin, an amino compound, and an aldehyde under slightly acidic conditions. In the Mannich reaction, the aldehyde is condensed with the amino compound and an active hydrogen supplied by the polyphenolic tannin. Although the structure of tannin is not completely known, it is believed the reaction product can be approximated by the following recurring structure:

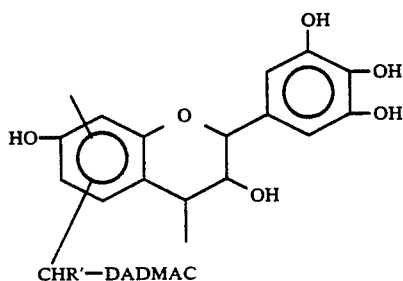

where CHR' is the remainder of the aldehyde compound after the condensation reaction and DADMAC (Diallyldimethyl ammonium chloride) is a cationic functionality incorporated in the reaction. DADMAC has the structure:

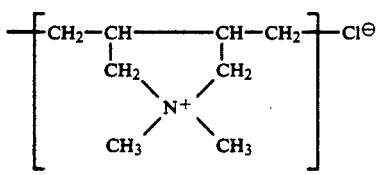

This polymeric tannin amine is available from Chem-Link under the trademark Perchem 530. It has an intrinsic viscosity of about 0.07 dl/g, a specific gravity of about 1.10 to about 1.15, a 50% solution viscosity of about 50 centipoise to about 400 centipoise and a pH of about 1.2 to 1.7.

Actual dosage ranges for the polymeric tannin amine depend upon the characteristics of the wastewater to be treated. These characteristics can include the amount of oil, the type of oil in the water, the presence and concentration of other contaminants, the amount of soluble metal ions present in the wastewater, and the pH of the water. Preferably, about 600 parts to about 650 parts of the polymeric tannin amine per million parts of the wastewater is employed, but activity was seen over the broader dosage range of 500 parts to 800 parts per million as well. Different wastewaters will surely have different optimum dosage ranges.

Representative metal ions that are thought to be flocculated by the tannin amine compounds include $Cu^{+2}$, $Cd^{+2}$ $Cr^{+6}$, $Pb^{+2}$, $Ni^{+2}$, $Zn^{+2}$ and $Hg^{+2}$. The polymers are particularly effective at flocculating $Cu^{+2}$.

An advantage of the instant invention is that the polymeric tannin amines are much less toxic than other commonly used metals removal products.

A comparison with sodium dimethyldithiocarbamate (DMDTC) and sodium trithiocarbonate (TTC) shows:

|  | LC50 Daphnia Magna | LC50 Rainbow Trout |
| --- | --- | --- |
| Polymeric Tannin Amine | 270 ppm | 230 ppm |
| DMDTC | 4.5 ppm | 0.85 ppm |
| TTC | 38.0 ppm | 7.50 ppm |

The polymeric tannin amine compounds can be added to the wastewater neat or in any suitable solvent such as water. These compounds can be used in conjunction with an additional floc culent to improve treatment of the wastewater. Representative flocculants can include alum and acrylamide copolymers. The preferred pH of the water is between 6.5 and 7.5. This can be adjusted using a suitable acid or base.

The resulting floc can be removed by any conventional means such as dissolved air flotation or induced air flotation. In order to more clearly illustrate this invention, the data set forth below were developed. The following examples are included as being illustrations of the invention and should not be construed as limiting the scope thereof.

EXAMPLE 1

Testing Procedure 200 ml of oily wastewater containing 3.49 ppm Cu from a Michigan steel mill was added to a jar. The polymeric tannin amine was then added to the jar while mixing at 100 rpm. This combination was then mixed at 100 rpm for 2 minutes, followed by 5 minutes at 35 rpm. The contents of the jar were allowed to settle for 5 minutes. These results are presented in Table I.

TABLE I

| Jar Testing Results | | |
| --- | --- | --- |
| Dosage (ppm) | Turbidity (NTU) | Oil Content (ppm) |
| 0 | >2000 | 280 |
| 200 | >2000 | |
| 400 | >2000 | - |
| 500 | 1325 | |
| 550 | 81.0 | 42 |
| 600 | 99.0 | 36 |
| 650 | 82.2 | 48 |
| 700 | 159.8 | |
| 800 | 363 | |

Oil analysis was performed using a freon extraction procedure and IR detection at 3.5 um with a Horiba, Ltd. oil analyzer. The pH of the sample was held between 6.5 and 7.5 for all the tests. The oil content of the raw, untreated water was 325 ppm.

The copper concentration was determined using graphite furnace atomic absorption spectrophotometry. The results of this testing for Example I indicate 3.49 parts per million Cu in the raw, untreated water and 21 parts per billion Cu in the treated water.

EXAMPLE 2

The testing procedure was followed as in Example 1 except that alum was employed in place of the polymeric tannin amine. The pH was adjusted to 6.5 to 7.5 during mixture at 35 rpm. These results are presented in Table II.

TABLE II

| Jar Testing Results Employing Alum | | |
| --- | --- | --- |
| Dosage (ppm) | Turbidity (NTU) | Oil Content (ppm) |
| 0 | >2000 | 280 |
| 200 | >2000 | |
| 400 | >2000 | |
| 500 | 1990 | |
| 600 | >2000 | |
| 700 | >2000 | |
| 800 | >2000 | |
| 900 | >2000 | |
| 1000 | 355 | |
| 1050 | 1544 | |
| 1100 | 92.5 | 120 |
| 1150 | 126.7 | 50 |
| 1200 | 528 | |
| 1300 | 313 | |
| 1400 | 192 | |
| 1500 | 203 | |

As seen in both Tables I and II, both the polymeric tannin amine and alum proved effective at oil removal but the tannin amine at much lower dosages. The tannin amine also proved effective at removing Cu from the wastewater.

EXAMPLE 3

The polymeric tannin amine was tested in combination with alum. 200 ml of oily wastewater was added to the jar, then the mixed for 1.5 minutes at 100 rpm. The alum was then added then mixed for 0.5 minutes at 100 rpm. The mixing continued at 35 rpm for 5 minutes during which time the pH was adjusted to 6.5 to 7.5. The combination was then allowed to settle for 5 minutes. These results are presented in Table III.

TABLE III

| | Combination Jar Testing | | |
|---|---|---|---|
| Polymer (ppm) | Alum (ppm) | Turbidity (NTU) | Oil Content (ppm) |
| 25 | 880 | >2000 | |
| 50 | 880 | 1277 | |
| 100 | 880 | 1475 | |
| 200 | 880 | 1063 | |
| 300 | 880 | 267 | |
| 400 | 880 | 104 | 72 |
| 500 | 880 | 1617 | |
| 600 | 880 | 970 | |

Similar testing was also performed and appears in Table IV.

TABLE IV

| | Combination Jar Testing | | |
|---|---|---|---|
| Polymer (ppm) | Alum (ppm) | Turbidity (NTU) | Oil Content (ppm) |
| 400 | 0 | >2000 | |
| 400 | 5 | >2000 | |
| 400 | 10 | >2000 | |
| 400 | 15 | 188.6 | 49 |
| 400 | 20 | 384 | 49 |
| 400 | 25 | 283 | |
| 400 | 25 | 142.8 | |
| 400 | 50 | 1027 | |
| 400 | 75 | >2000 | |
| 400 | 100 | >2000 | |
| 400 | 125 | >2000 | |
| 400 | 150 | >2000 | |
| 600 | 0 | 73.5 | 21 |
| 600 | 5 | 102.6 | |
| 600 | 10 | 103.8 | |
| 600 | 15 | 96.2 | |
| 600 | 20 | 94.4 | 28 |
| 600 | 25 | 98.6 | |

The results of Tables III and IV indicate that little advantages is gained when using the polymeric tannin amine in combination with alum.

While this invention has described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for removing oil and metal ions selected from the group consisting of $Cu^{+2}$, $Cd^{+2}$, $Cr^{+6}$, $Pb^{+2}$, $Ni^{+2}$, $Zn^{+2}$, and $Hg^{+2}$, present in wastewater comprising adding of a sufficient amount of an amphoteric tannin amine polymer to flocculate said oil and metal ions, then removing said flocculated oil and metal ions from said wastewater, wherein said tannin amine polymer is formed by reacting a tannin, diallyldimethyl ammonium chloride (DADMAC) and an aldehyde, and said aldehyde is condensed with said DADMAC.

2. The method as claimed in claim 1 wherein said tannin amine polymer has the structure:

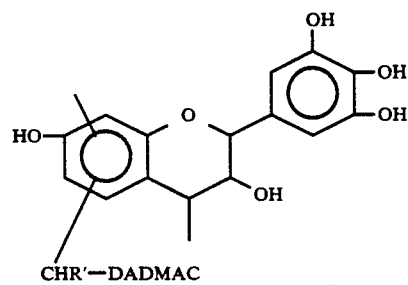

CHR'—DADMAC wherein CHR' is the remainder of the aldehyde compound after the condensation reaction and DADMAC is diallyldimethyl ammonium chloride.

3. The method as claimed in claim 1 wherein said metal ion is copper $Cu^{+2}$.

4. The method as claimed in claim 1 wherein said tannin amine polymer is added to said wastewater in a carrier solvent.

5. The method as claimed in claim 4 wherein said carrier solvent is water.

6. The method as claimed in claim 1 wherein said tannin amine polymer is added to said wastewater in an amount from about 500 parts to 800 parts per million wastewater.

7. The method as claimed in claim 1 wherein said tannin amine polymer is added to said wastewater with an additional flocculant.

* * * * *